US008357886B2

(12) United States Patent
Yoshidome

(10) Patent No.: US 8,357,886 B2
(45) Date of Patent: Jan. 22, 2013

(54) DRAWER TYPE COOKING DEVICE

(75) Inventor: Akihiro Yoshidome, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 867 days.

(21) Appl. No.: 12/466,555

(22) Filed: May 15, 2009

(65) Prior Publication Data

US 2009/0289057 A1 Nov. 26, 2009

(30) Foreign Application Priority Data

May 23, 2008 (JP) ................................ 2008-135232

(51) Int. Cl.
*H05B 6/80* (2006.01)
*H05B 6/64* (2006.01)
*A21B 1/00* (2006.01)
*F23M 7/00* (2006.01)

(52) U.S. Cl. ........ 219/725; 219/756; 219/757; 219/391; 219/400; 126/190; 126/192

(58) Field of Classification Search .................. 219/725, 219/681, 756, 762, 763, 385, 399, 392, 403, 219/391, 757, 394, 478; 99/443 R, 476, 99/483; 126/190, 340, 192, 21 R, 273 R; 312/330.1
See application file for complete search history.

(56) References Cited

U.S. PATENT DOCUMENTS

2006/0016350 A1 * 1/2006 Yoshidome .................... 99/483
2006/0137250 A1 * 6/2006 Imai et al. ....................... 49/360

FOREIGN PATENT DOCUMENTS

JP 2006-38296 A 2/2006
JP 2008-8562 A 1/2008

* cited by examiner

*Primary Examiner* — Henry Yuen
*Assistant Examiner* — Hung D Nguyen
(74) *Attorney, Agent, or Firm* — Birch, Stewart, Kolasch & Birch, LLP

(57) ABSTRACT

A drawer type cooking device for disconnecting and connecting the linkage between the drawer body and the movement mechanism in response to the user's selection of operation between a manual opening/closing operation and an electric automatic opening/closing operation of the drawer body. Based on the user's input via the operation unit, connection/disconnection of power transmission via a clutch mechanism and driving/stopping of a drive mechanism is automatically controlled. By turning the clutch mechanism off and isolating the drawer body from the motor, the load of manual operation to open/close the drawer body is reduced. Based on the user's operation via the operation unit, the clutch mechanism is set to connected state, and in that state, the drive mechanism is driven so that power is transmitted to the rack of the drawer body, and the drawer body can be automatically opened and closed.

4 Claims, 6 Drawing Sheets

FIG. 4

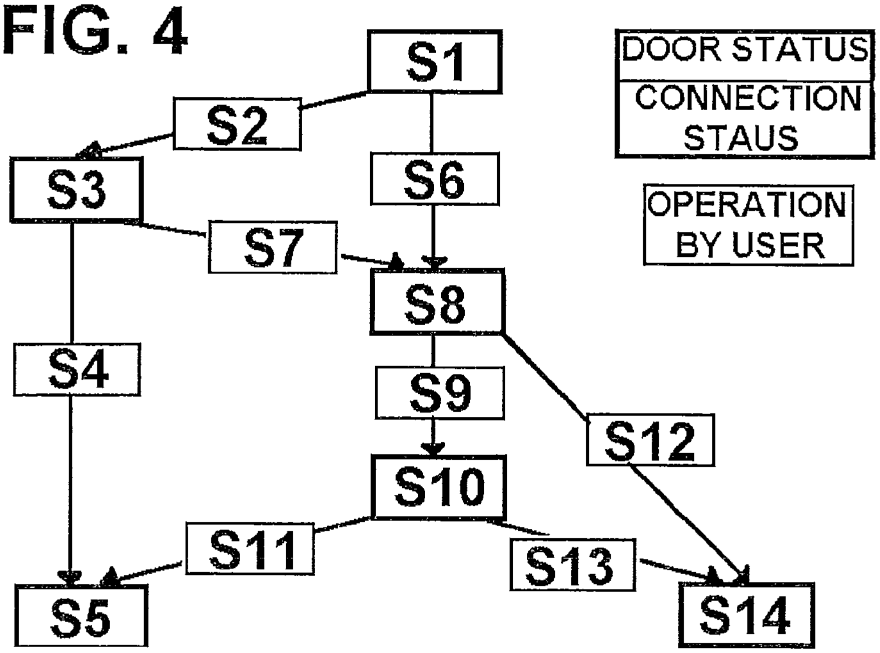

S1: STANDBY STATE (DOOR AT FULLY-CLOSED STATE)
CONNECTION BETWEEN DRIVE MECHANISM AND MOVEMENT MECHANISM: OFF
S2: WHEN MANUAL OPERATION IS PERFORMED USING HANDLE
S3: DOOR OPENED WHILE CONNECTION IS OFF
CONNECTION BETWEEN DRIVE MECHANISM AND MOVEMENT MECHANISM: OFF
S4: WHEN MANUAL OPERATION IS PERFORMED USING HANDLE
S5: DOOR IS FULLY OPENED AND STOPPED
CONNECTION BETWEEN DRIVE MECHANISM AND MOVEMENT MECHANISM: OFF
S6: WHEN OPEN KEY OF OPEREATION UNIT IS PRESSED
S7: WHEN MANUAL OPERATION IS STOPPED MIDWAY AND OPEN KEY OF OPERATION UNIT IS PRESSED
S8: CONNECTION IS ON AND DOOR IS OPENED AUTOMATICALLY
CONNECTION BETWEEN DRIVE MECHANISM AND MOVEMENT MECHANISM: ON
S9: WHEN DOOR IS STOPPED MIDWAY BY HAND
S10: DOOR IS STOPPED AND CONNECTION IS OFF
CONNECTION BETWEEN DRIVE MECHANISM AND MOVEMENT MECHANISM: OFF
S11: WHEN MANUAL OPERATION IS PERFORMED USING HANDLE
S12: NO OPERATION
S13: WHEN OPEN KEY OF OPERATION UNIT IS PRESSED
S14: DOOR IS FULLY OPENED AUTOMATICALLY AND STOPPED
FULLY-OPENED SWITCH IS DETECTED AND CONNECTION IS OFF
CONNECTION BETWEEN DRIVE MECHANISM AND MOVEMENT MECHANISM: OFF

FIG. 5

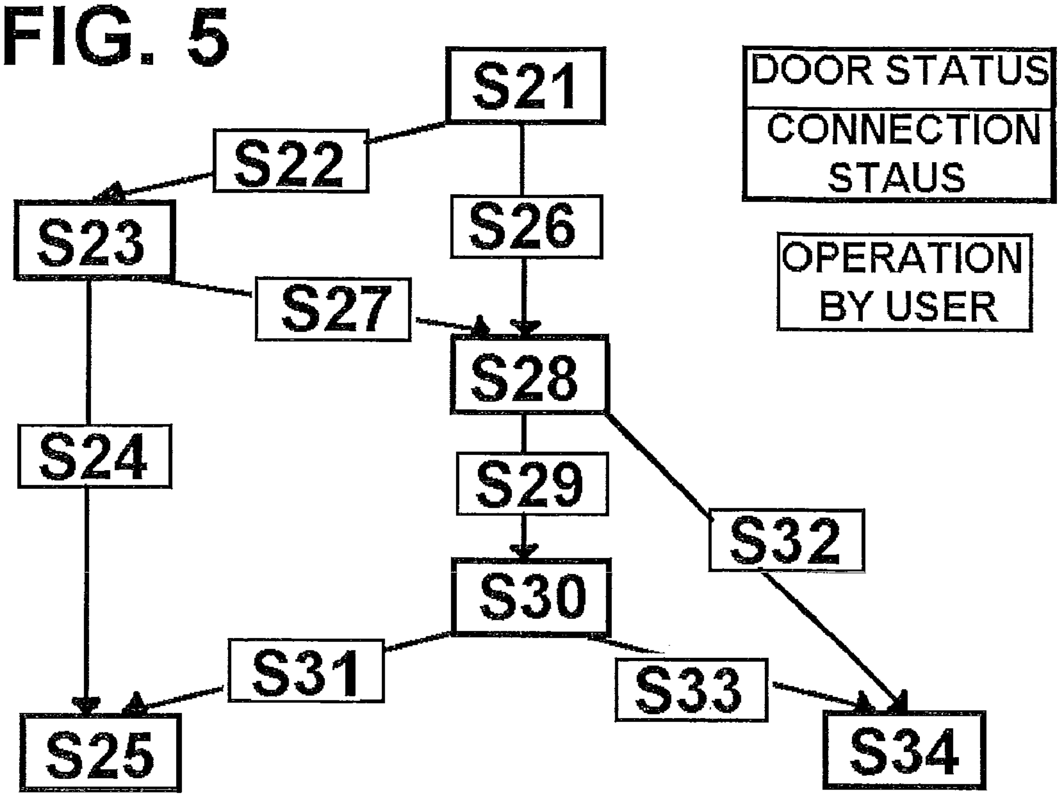

S21: STANDBY STATE (DOOR AT FULLY-OPENED STATE)
CONNECTION BETWEEN DRIVE MECHANISM AND MOVEMENT MECHANISM: OFF

S22: WHEN MANUAL OPERATION IS PERFORMED USING HANDLE

S23: DOOR CLOSED WHILE CONNECTION IS OFF
CONNECTION BETWEEN DRIVE MECHANISM AND MOVEMENT MECHANISM: OFF

S24: WHEN MANUAL OPERATION IS PERFORMED USING HANDLE

S25: DOOR IS FULLY CLOSED AND STOPPED
CONNECTION BETWEEN DRIVE MECHANISM AND MOVEMENT MECHANISM: OFF

S26: WHEN CLOSE KEY OF OPEREATION UNIT IS PRESSED

S27: WHEN MANUAL OPERATION IS STOPPED MIDWAY AND CLOSE KEY OF OPERATION UNIT IS PRESSED

S28: CONNECTION IS ON AND DOOR IS CLOSED AUTOMATICALLY
CONNECTION BETWEEN DRIVE MECHANISM AND MOVEMENT MECHANISM: ON

S29: WHEN DOOR IS STOPPED MIDWAY BY HAND

S30: DOOR IS STOPPED AND CONNECTION IS OFF
CONNECTION BETWEEN DRIVE MECHANISM AND MOVEMENT MECHANISM: OFF

S31: WHEN MANUAL OPERATION IS PERFORMED USING HANDLE

S32: NO OPERATION

S33: WHEN CLOSE KEY OF OPERATION UNIT IS PRESSED

S34: DOOR IS FULLY CLOSED AUTOMATICALLY AND STOPPED
FULLY-CLOSED SWITCH IS DETECTED AND CONNECTION IS OFF
CONNECTION BETWEEN DRIVE MECHANISM AND MOVEMENT MECHANISM: OFF

DRAWER TYPE COOKING DEVICE

The present application is based on and claims priority of Japanese patent application No. 2008-135232 filed on May 23, 2008, the entire contents of which are hereby incorporated by reference.

BACKGROUND OF THE INVENTION

1. Field of the Invention

The present invention relates to a drawer type cooking device with an opening/closing mechanism for automatically opening and closing a drawer body.

2. Description of the Related Art

Conventionally, a large number of cooking devices such as microwave ovens with front-opening doors are proposed, but there are also proposed other types of cooking devices, such as drawer type cooking devices having drawers that open in the frontward direction. In such drawer type cooking devices, an object to be cooked is carried into a heating chamber through a door that opens by being drawn out, and after the object is cooked, it is taken out of the cooking device. Drawer type cooking devices are suitably applied to relatively large systems, so they are considered as cooking devices to be suitably adopted in kitchen units.

The present applicant has proposed in Japanese patent application laid-open publication No. 2006-038296 (patent document 1) a drawer type cooking device having a drawer body for storing objects to be cooked capable of being drawn out of the cooking device body. According to the drawer-type cooking device, a drawer body is slidably disposed with respect to a cooking device body via a slide mechanism composed of a fixed rail attached to the cooking device body having a heating chamber formed in the interior thereof and a movable rail attached to the drawer body, wherein when the drawer body occupies a stored position, the opening of the heating chamber is sealed via a door equipped to the drawer body, and the cooking device is further equipped with a means for preventing unintended operation of a microwave oscillation stop switch due to erroneous operation or pranks.

According to such drawer type cooking device, the mechanism for performing automatic opening and closing of the door integrated with the drawer body normally drives the drawer body via a reduction mechanism by a driving motor, so that when the user moves the drawer body via manual operation, the motor is driven via a force passing the reduction mechanism in the opposite direction, causing a large load to be applied on the reduction mechanism.

Therefore, the present applicant has proposed in Japanese patent application laid-open publication No. 2008-008562 (patent document 2) a drawer type cooking device having improved operability and small fear of failure of the motor and the gear unit for automatic door opening/closing operation, comprising an electromagnetic clutch for connecting and disconnecting power transmission, the path of which composed of a gear, a rack and the like, for moving a drawer body using motor output, wherein based on the selection of a user, the electromagnetic clutch can be set to connected state so that the output of the motor is used to open and close the door of the cooking device automatically, and when the door is to be opened and closed manually, the connection of the electromagnetic clutch is turned off so as to disconnect the path between the motor and prevent manual operation force from being transmitted to the motor, thereby preventing application of excessive torque load on the power transmission path and generation of back electromotive force in the motor. There are various possible configurations of an operation switch for turning the electromagnetic clutch on and off, but normally, an operation switch and a display unit for displaying the on/off of the electromagnetic clutch must additionally be provided in the operation unit, but according to such example, matters requiring the operation and decision-making of the user are increased, which leaves room for further improvement of usability.

It is possible to incorporate an open/close assistance mechanism for driving the motor in response to the operation of the user via the operation unit. Whether the door is fully-closed or fully-opened can be detected via a micro-switch or the like, and the direction of opening/closing operation in either state is restricted to one direction, so it is easy to perform an opening/closing operation in response to detecting the operation of the user. However, in midway of opening and closing the door, the possibility of the direction of manual operation of the door is not restricted to one direction, but can be in both opening and closing directions. In order to correctly detect the direction of manual operation and to set the direction of rotation of the motor correctly in response to the direction of manual operation to perform automatic opening/closing operation, the system requires a detecting means of the open/close direction and a control mechanism of the motor to the open/close assistance mechanism. Additional cost is required to provide such detecting means and control mechanism.

Therefore, one problem to be solved in the prior art is the disconnection and connection of the linkage of the drawer body and the movement mechanism in an appropriate manner corresponding to the respective opening/closing operation automatically in a simple manner when the user performs operation to open/close the drawer body either manually or automatically via electric operation.

SUMMARY OF THE INVENTION

The present invention aims at solving the problems of the prior art by providing a drawer type cooking device having improved the usability of opening/closing the drawer body and having a superior price performance, wherein the usability of the cooking device is improved by automatically connecting and disconnecting the linkage between the drawer body and the movement mechanism in response to the operation of the user to open or close the drawer body either manually or automatically via electric operation without providing a complex and expensive sensor or control mechanism.

In order to solve the above-mentioned problems of the prior art, the present invention provides a drawer type cooking device comprising a cooking device body having a heating chamber using microwaves formed in an interior thereof; a drawer body disposed movably between a stored position within the heating chamber and a drawn-out position outside the heating chamber with respect to the cooking device body; a slide mechanism capable of moving the drawer body with respect to the cooking device body; a drive mechanism for driving the slide mechanism; a clutch mechanism for connecting and disconnecting a power via a power transmission path from the drive mechanism to the slide mechanism; a control unit for controlling the drive mechanism and the clutch mechanism; and an operation unit to be operated by a user for input to the control unit with respect to opening and closing the drawer body; wherein the control unit controls the disconnection of power transmission via the clutch mechanism and the stopping of the drive mechanism in response to a selection of manual opening and closing operation of the user via the operation unit, and controls the connection of power transmission via the clutch mechanism and the driving of the drive mechanism in response to a selection of automatic opening and closing operation of the user via the operation unit; the operation unit comprises an open/close button for providing an instruction to the control unit regarding the automatic opening and closing of the drawer body when operated; the clutch mechanism is set so that the power transmission is at a disconnected state in a normal state when the open/close button is not operated; and the control unit sets the power transmission via the clutch mechanism to a connected state in response to the instruction provided when the open/close button is operated, and the drive mechanism is driven when the clutch mechanism is at the connected state.

According to the present drawer type cooking device, the control unit controls the connection/disconnection of the power transmission in the clutch mechanism and the driving/stopping of the drive mechanism automatically in response to the input operation of the user via the operation unit, so that the disconnection of power via the clutch mechanism and the stopping of the drive mechanism can be realized immediately for manual opening/closing operation, and the connection of power via the clutch mechanism and the driving of the drive mechanism can be realized for automatic opening/closing operation, so that the usability of opening and closing the drawer body can be improved.

In detail, in a normal state where the open/close button is not operated, the clutch mechanism is at off state, according to which the drive mechanism and the slide mechanism are isolated, so that when the user attempts to open or close the door manually, the operation can be performed with a small load. When the user wishes to perform automatic opening/closing operation, the user operates the open/close button of the operation unit, and in response to the operation, at first, the clutch mechanism is turned on to connect the power transmission between the drive mechanism and the slide mechanism, and thereafter, the operation of the drive mechanism causes the drive force to be transmitted via the clutch mechanism and the slide mechanism to the drawer body, thereby automatically moving the drawer body in the desired direction of the user.

Further according to the present drawer type cooking device, a motor provided in the drive mechanism is equipped with a speed detecting means for detecting a number of rotation of the motor during the automatic opening/closing operation; and the control unit performs control to stop the drive mechanism by setting the power transmission via the clutch mechanism to a disconnected state in response to the detection of speed reduction of the motor by the speed detecting means when the drawer body is stopped.

According to the above-described arrangement, when the drawer body is either fully opened or fully closed, or when the user stops the operation, the motor is stopped, and the clutch mechanism connecting the drive mechanism and the slide mechanism can be turned off.

Furthermore, when the movement of the drawer body is stopped due to reasons such as an obstacle blocking the drawer body during automatic opening/closing operation, at first, a control is performed to turn the clutch mechanism off, so that the drive force of the drawer body is immediately stopped and the drawer body is disengaged from the drive mechanism and freed.

According to the above arrangement, the drive force can be stopped more promptly compared to when performing stop control via the drive mechanism with the drive mechanism connected, and the movement of the drawer body is facilitated, so that the recovery operation such as the elimination of the obstacle can be performed easily, and the safety of the cooking device can be improved.

As described, since the control unit controls the connection/disconnection of the linkage of the drawer body and the drive mechanism and the driving/stopping of the motor rationally in response to the speed detected by the speed detecting means, the user can acquire the expected opening/closing operation of the drawer body either manually or automatically when opening/closing the cooking device through intuitive operation, so that the usability of the cooking device can be improved.

Moreover, according to the present drawer type cooking device, the clutch mechanism can be an electromagnetic clutch. In this case, not only when the user turns off the automatic opening/closing of the drawer body and the cooking device is stopped, but also when the power supply is stopped for example by power outage or switch board operation, the electromagnetic clutch connecting the drive mechanism and the slide mechanism is turned off due to lack of power supply. Therefore, since the connection between the drive mechanism and the slide mechanism is disconnected (isolated), the latch can be released and the door can be opened via manual operation with a small load, and manual opening/closing operation is enabled.

According to the prior art drawer type cooking device (such as the one disclosed in patent document 2), the user needs to perform operation to connect/disconnect the linkage via the clutch mechanism in response to the open/close status of the drawer body, and for example, since the linkage is not disconnected prior to performing manual opening/closing operation, there was fear that the drive system may be driven through the manual opening/closing operation. However, according to the drawer type cooking device of the present invention, the control unit performs control to connect/disconnect the power transmission from the drive mechanism to the slide mechanism via the clutch mechanism in response to the input operation of the user through the operation unit, and also performs control to drive/stop the drive mechanism, so that when the user performs either manual or automatic opening/closing operation of the drawer body, the clutch mechanism performs control to connect/disconnect the linkage between the drawer body and the movement mechanism automatically and to drive/stop the drive mechanism in response to the operation of the user. Therefore, the present invention provides an opening/closing mechanism capable of being controlled automatically in response to the operation of the user without having to provide a complex and expensive sensor or control mechanism as in the drawer type cooking device disclosed in patent document 1, so that the present invention enables to realize a drawer type cooking device having advantageous usability with improved opening/closing operation and superior price performance.

BRIEF DESCRIPTION OF THE DRAWINGS

FIG. 4 is an operation flow of the drawer type cooking device when the user performs a door-open operation either manually or automatically when the door is at fully-closed state;

FIG. 5 is an operation flow of the drawer type cooking device when the user performs a door-close operation either manually or automatically when the door is at a fully opened state.

DETAILED DESCRIPTION OF THE PREFERRED EMBODIMENTS

Now, the preferred embodiments of the drawer type cooking device according to the present invention will be described with reference to the accompanying drawings.

Figure 1:
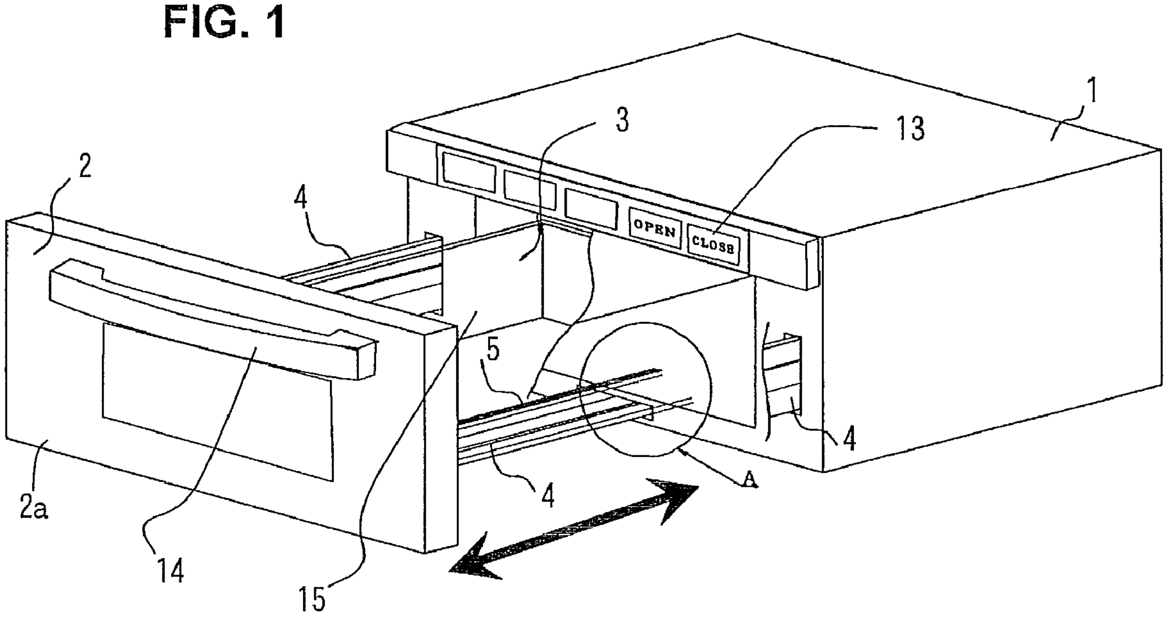
FIG. 1 is a perspective view showing a partially-cutaway overall external view according to one embodiment of a drawer type cooking device according to the present invention.
Figure 2:
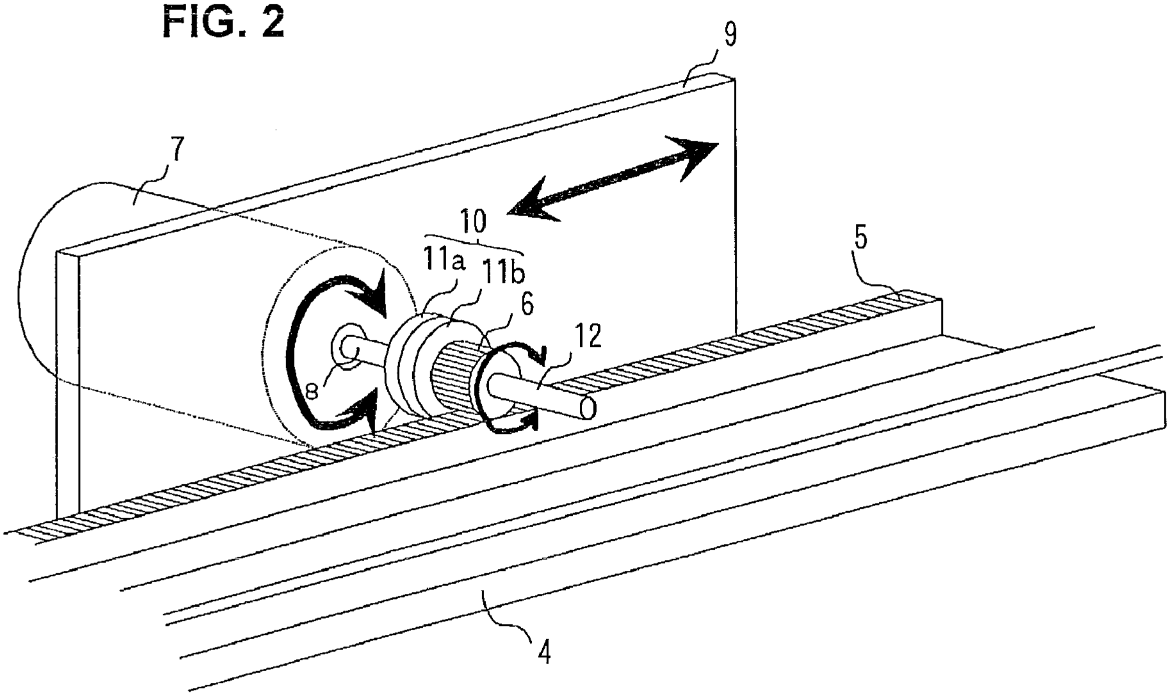
FIG. 2 is a perspective view showing the outline of a drive mechanism used in the portion denoted by reference letter A in the drawer type cooking device shown in FIG. 1.
Figure 3:
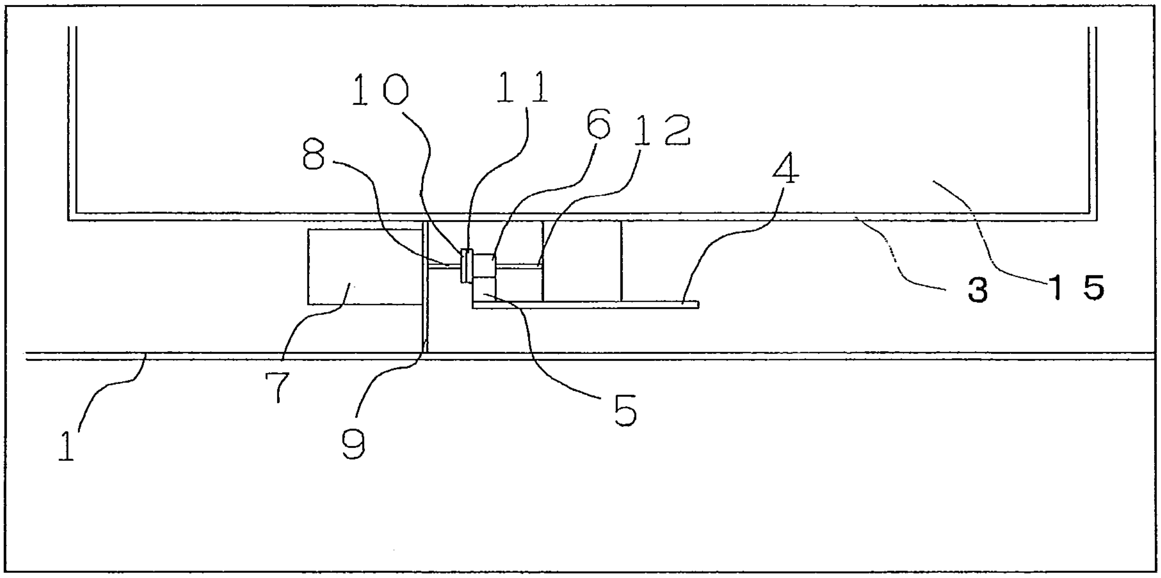
FIG. 3 is a schematic view of the drive mechanism shown in FIG. 2.

FIG. 1 is a perspective view showing a partially-cutaway overall external view according to one embodiment of the drawer type cooking device according to the present invention, and FIG. 2 is a perspective view showing the outline of a drive mechanism used in the portion denoted by reference letter A in the drawer type cooking device shown in FIG. 1. FIG. 3 is a schematic view of the drive mechanism shown in FIG. 2.

As shown in FIG. 1, the drawer type cooking device (hereinafter simply referred to as "cooking device") comprises a cooking device body 1, and a drawer body 2 capable of being drawn out of the cooking device body 1. A heating chamber 3 for cooking an object to be heated loaded in the drawer body 2 is formed in the interior of the cooking device body 1.

The drawer body 2 is movably disposed within the cooking device body 1 via a slide mechanism described later so that it can be pulled out toward the front direction from within the heating chamber 3 of the cooking device body 1 in the direction shown by the arrow in FIG. 1. The drawer body 2 comprises a door 2*a* for opening and closing the heating chamber 3 and a heating container 15 to which the door 2*a* is attached for storing the object to be heated in a loaded state.

The drawer body 2 can be moved between a drawn-out position in which the drawer body 2 is pulled out in the frontward direction from the cooking device body 1 so that the heating container 15 is placed outside the heating chamber 3 (corresponding to the drawn-out state of FIG. 1) and a stored position in which the drawer body 2 is pushed into the cooking device body 1 and the heating container 15 is stored in the heating chamber 3. The cooking device comprises left and right slide mechanisms 4 and 4 disposed on the left and right sides on the outer side of the heating chamber 3 and a center slide mechanism 4 disposed at the center on the outer side below the heating chamber 3.

Each slide mechanism 4 comprises a fixed rail attached to the cooking device body 1 and a movable rail attached to the drawer body 2 that can be slid along the fixed rail.

In the present embodiment, as shown in FIGS. 2 and 3, a drive mechanism is disposed in the center slide mechanism 4 so as to open and close the drawer body 2 automatically.

As shown in FIG. 2, the drive mechanism comprises a motor 7 attached to the cooking device body 1 as drive source. The motor 7 comprises a motor main body attached to a motor mounting angle 9 fixed to the fixed rail 9, and a motor shaft 8 as rotary output shaft extending from the motor main body.

The drive mechanism further comprises a pinion gear 6 connected to the motor shaft 8 and a rack gear 5 attached to the movable rail and engaged with the pinion gear 6. The pinion gear 6 is attached to a pinion gear shaft 12. The rotary output of the motor 7 is transmitted from the pinion gear 6 via the rack gear 5 to the movable rail.

Between the motor shaft 8 and the pinion gear shaft 12 is disposed a clutch 10 connecting the motor shaft 8 and the pinion gear shaft 12 in a disconnectable manner. The clutch 10 comprises a clutch member 11*a* attached to the motor shaft 8 and a clutch member 11*b* attached to the pinion gear shaft 12. In the state where the clutch members 11*a* and 11*b* are connected and the clutch 10 is set to on state, when the motor 7 operates, the power is transmitted via the clutch 10 to the pinion gear 6, and the rotation of the pinion gear 6 is further transmitted via the rack gear 5 to the slide mechanism, by which the movable rail is slid with respect to the fixed rail.

The motor 7 and the motor shaft 8 belong in the drive mechanism, and the clutch 10, the pinion gear 6, the pinion gear shaft 12 and the rack gear 5 belong in the transmission mechanism.

The transmission mechanism comprises a pinion gear 6 attached to the end of the clutch 10, and a rack gear 5 engaged with the pinion gear 6. The rack gear 5 is arranged on the movable rail along the direction of movement of the drawer body 2, and in correspondence with the rack gear 5, the motor shaft 8 is extended in the direction orthogonal to the direction in which the rack gear 5 extends, with the clutch 10 attached to the end of the motor shaft 8.

The clutch 10 can be composed of an electromagnetic clutch. The clutch member 11*a* of the clutch 10 is composed of a permanent magnet, and the clutch member 11*b* is composed of an electromagnet. Therefore, when power is fed to the clutch 10, the magnetic force of the clutch 11*b* which is an electromagnet connects the clutch member 11*b* with the clutch member 11*a* which is a permanent magnet, and the members are rotated in an interlocked manner. When power is not fed to the clutch 10, the clutch members 11*a* and 11*b* are isolated, and the clutch member 11*b* is at a stopped state even when the clutch member 11*a* is rotated, so that power is not transmitted to the clutch member 11*b*.

As described, when the door is opened and closed manually, by having no power fed to the clutch 10, the connection via the power transmission path between the drive mechanism and the movement mechanism is disconnected, and the connection is at an off state. Therefore, even when the pinion gear 6 is rotated by the rack gear 5 via the movement mechanism by the operation of the door 2*a*, the drive mechanism such as the motor shaft 8 and the motor 7 are not driven, so that only a small operation force is required to open and close the door 2*a*.

An operation unit 13 comprises, as open/close buttons, an OPEN key to be pressed for opening the door 2*a* and a CLOSE key to be pressed for closing the door 2*a*. In the normal state, neither the OPEN key nor the CLOSE key are pressed, and during such normal state, the power transmission via the clutch 10 is at a disconnected state (off state) and the drive mechanism and the slide mechanism are isolated, so that when the user wishes to open or close the door 2*a* manually, the opening/closing operation can be performed with a small load without driving the motor 7.

On the other hand, when the user presses the OPEN key or the CLOSE key of the operation unit 13, the control unit supplies power to the clutch 10 and brings the power transmission to a connected state in response to the pressing of the key, and the clutch 10 drives the motor 7 in the direction of rotation corresponding to the key having been pressed in the connected state. In other words, in response to the pressed state of the key, the clutch 10 is turned on and the power transmission from the motor 7 to the slide mechanism is set to connected state, and thereafter, the drive force by the operation of the motor 7 is transmitted via the clutch 10 and the slide mechanism 4 to the drawer body, by which the drawer body is automatically moved to the opening direction when the OPEN key is pressed and automatically moved to the closing direction when the CLOSE key is pressed. As described, when the open/close button is pressed, power is supplied to the clutch 10 and the clutch 10 is at connected state, according to which the rotation of the motor 7 is transmitted to the movement mechanism and the door 2*a* opens or closes automatically.

According to the present embodiment, the clutch 10 is an electromagnetic clutch, so that with respect to the automatic opening/closing operation of the drawer body by the user, not only when the cooking device is stopped due to the operation of the user to turn the cooking device off, but also when the power supply is stopped due for example to power outage or switch board operation, the electromagnetic clutch cannot receive power supply and is turned off. Therefore, since the clutch 10 is disconnected (isolated), the user can open the door by opening the latch via manual operation with a small load.

Next, the operation flow of the drawer type cooking device according to the present invention will be described with reference to FIGS. 4 and 5. FIG. 4 shows an operation flow of the drawer type cooking device according to the present invention when the user performs a manual or automatic door-open operation when the door 2*a* of the drawer body 2 is at a fully closed state. In each block of the operation flow, the upper stage shows the state of the door, and the lower stage shows the state of connection of the drive mechanism and the movement mechanism.

When the door is fully closed and at standby state, and the connection of the drive mechanism and the movement mechanism via the clutch mechanism is at off state (OFF) (step 1; abbreviated as S1. The same applies to the subsequent steps), manual operation using the handle is started (S2; in other words, manual operation is performed in the direction to open the door), and the door is opened with the above-described connection at off state (S3). In this state, when the manual operation via the handle is continued (S4), the door is fully opened and stopped (S5) with the above-described connection at off state. In S1, when the OPEN key of the operation unit is pressed (S6), or when the manual operation is stopped in midway of the opening operation in S3 and the OPEN key of the operation unit is pressed (S7), the connection state of the drive mechanism and the movement mechanism via the clutch mechanism is turned on (ON), and the door opens automatically (S8). When the opening of the door is stopped by hand in midway of the automatic open operation of S8 (S9), the door having been automatically opened is stopped, and the above-mentioned connection is turned off (S10). After S10, when manual operation using the handle is started, the process advances to the state of S5, similar to the case of S2, wherein the above-mentioned connection is maintained at off state, and the door is fully opened and stopped in that state. In S8, when no operation is performed (S12), or when the OPEN key of the operation unit is pressed in S10 (S13), the door is fully opened and stopped automatically, a fully-opened switch is detected, and the above-mentioned connection state is maintained at off state (S14).

FIG. 5 shows an operation flow of the drawer type cooking device according to the present invention when the user performs a door close operation either manually or automatically when the door is at a fully opened state.

When the door is fully opened and at standby state, and the connection of the drive mechanism and the movement mechanism via the clutch mechanism is at off state (step 21; abbreviated as S21. the same applies to the subsequent steps), manual operation using the handle is started (S22; in other words, manual operation is performed in the direction to close the door), and the door is closed with the above-described connection at off state (S23). In this state, when the manual operation via the handle is continued (S24), the door is fully closed and stopped (S25) with the above-described connection at off state. In S21, when the CLOSE key of the operation unit is pressed (S26), or when the manual operation is stopped in midway of the opening operation in S23 and the CLOSE key of the operation unit is pressed (S27), the connection state of the drive mechanism and the movement mechanism via the clutch mechanism is turned on, and the door is closed automatically (S28). When the closing of the door is stopped by hand in midway of the automatic closing operation of S28 (S29), the door having been automatically closed is stopped, and the above-mentioned connection is turned off (S30). After S30, when manual operation via the handle is started, the process advances to the state of S25, similar to the case of S22, wherein the above-mentioned connection is maintained at off state, and the door is fully closed and stopped. In S28, when no operation is performed (S32), or when the CLOSE key of the operation unit is pressed in S30 (S33), the door is fully closed and stopped automatically, a fully-closed switch is detected, and the above-mentioned connection state is maintained at off state (S34).

According to the present embodiment, the drive mechanism is applied to the slide mechanism 4 disposed at the center of the cooking device, but the application of the present invention is not restricted thereto, and the drive mechanism can also be applied to one location on either the left or right slide mechanism 4, or can be applied to multiple locations of the center slide mechanism 4 and the left and right slide mechanisms 4, which are operated in interconnection. Further, the heating container 15 is not restricted to a container, and can be a loading unit such as a table.

Figure 6:
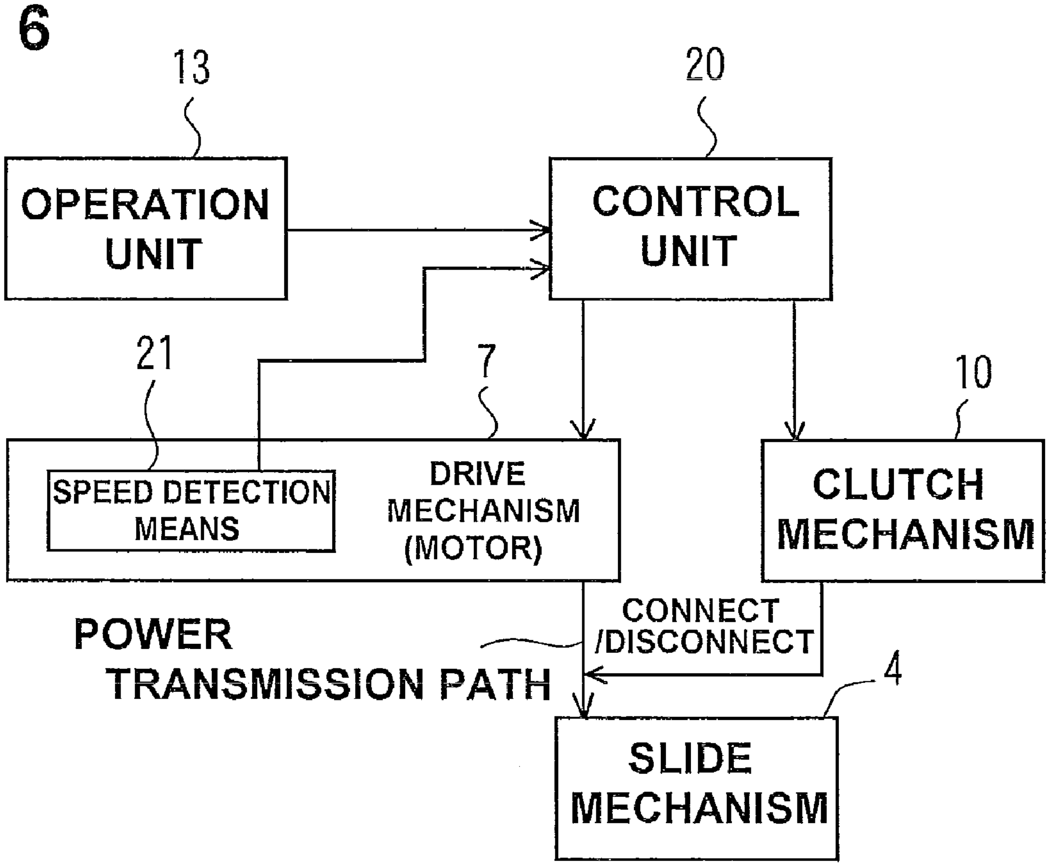
FIG. 6 is a block diagram showing one example of a drawer type cooking device according to the present invention.

FIG. 6 illustrates a block diagram of a drawer type cooking device according to the present invention. The content of operation through the selection and pressing of a key by the user via the operation unit 13 is entered to a control unit 20. Further, the movement speed of the drawer body 2 detected by a speed detecting means 21 such as a rotary encoder assembled to the motor 7, or the speed signal corresponding thereto, is entered to the control unit 20. The control signal of the control unit 20 is output to the drive mechanism (motor 7) and the clutch 10. By the operation of the clutch 10, the connected or disconnected state via the power transmission path from the drive mechanism (motor 7) to the slide mechanism 4 is determined by the operation of the clutch 10.

As described, normally the connection of the clutch 10 is at off state, and when the user opens and closes the door via manual operation, the opening and closing can be performed with a small operation force, and when the user operates the key (switch) of the operation unit 13 to perform open and close operation via electric operation, the connection of the clutch 10 is turned on and the door is automatically opened and closed via electric operation, so that the user can perform opening and closing operation without being aware of the on and off operation of the connection of the drive mechanism. As described, according to the drawer type cooking device of the present invention, the manual opening/closing state or the automatic opening/closing state is determined, and the clutch mechanism is turned on or off accurately in response to the state, so that a drawer type cooking device having advantageous usability is provided without requiring additional installation of an operation unit or display unit dedicated to the operation of the clutch mechanism, and without leaving the on/off operation of the clutch mechanism to the intuitive consideration and decision of the user, since the on/off is determined accurately by the control unit.

The invention claimed is:

1. A drawer type cooking device comprising:

a cooking device body having a heating chamber using microwaves formed in an interior thereof:

a drawer body disposed movably between a stored position within the heating chamber and a drawn-out position outside the heating chamber with respect to the cooking device body;

a slide mechanism capable of moving the drawer body with respect to the cooking device body;

a drive mechanism for driving the slide mechanism;

a clutch mechanism for connecting and disconnecting a power via a power transmission path from the drive mechanism to the slide mechanism;

a control unit for controlling the drive mechanism and the clutch mechanism; and an operation unit to be operated by a user with respect to opening and closing the drawer body for input to the control unit;

wherein the control unit controls the disconnection of power transmission via the clutch mechanism and the stopping of the drive mechanism in response to a selection of manual opening and closing operation of the user via the operation unit during automatic operation of the drawer body, and controls the connection of power transmission via the clutch mechanism and the driving of the drive mechanism in response to a selection of automatic opening and closing operation of the user via the operation unit;

the operation unit comprises an open/close button for providing an instruction to the control unit regarding the automatic opening and closing of the drawer body when operated;

the clutch mechanism is set so that the power transmission is at a disconnected state in a normal state when the open/close button is not operated; and the control unit sets the power transmission via the clutch mechanism to a connected state in response to the instruction provided when the open/close button is operated during manual operation of the drawer body, and the drive mechanism is driven when the clutch mechanism is at the connected state.

2. The drawer type cooking device according to claim 1, wherein a motor of the drive mechanism is equipped with a speed detecting means for detecting a number of rotation of the motor during the automatic opening/closing operation; and the control unit performs control to stop the drive mechanism by setting the power transmission via the clutch mechanism to a disconnected state in response to the detection of speed reduction of the motor by the speed detecting means when the drawer body is stopped.

3. The drawer type cooking device according to claim 1, wherein the clutch mechanism is an electromagnetic clutch.

4. The drawer type cooking device according to claim 2, wherein the clutch mechanism is an electromagnetic clutch.

* * * * *